(12) United States Patent
Zambov et al.

(10) Patent No.: US 8,481,109 B2
(45) Date of Patent: Jul. 9, 2013

(54) DICHROIC FILTERS FORMED USING SILICON CARBIDE BASED LAYERS

(76) Inventors: Ludmil M. Zambov, Midland, MI (US); Vasgen A. Shamamian, Midland, MI (US); Jeffrey A. Seifferly, Bay City, MI (US); Susan V. Perz, Essexville, MI (US)

( * ) Notice: Subject to any disclaimer, the term of this patent is extended or adjusted under 35 U.S.C. 154(b) by 367 days.

(21) Appl. No.: 12/597,764

(22) PCT Filed: Aug. 6, 2008

(86) PCT No.: PCT/US2008/072260
§ 371 (c)(1),
(2), (4) Date: Apr. 6, 2010

(87) PCT Pub. No.: WO2009/023482
PCT Pub. Date: Feb. 19, 2009

(65) Prior Publication Data
US 2010/0284088 A1    Nov. 11, 2010

Related U.S. Application Data

(60) Provisional application No. 60/964,972, filed on Aug. 16, 2007.

(51) Int. Cl.
*B05B 5/00* (2006.01)
*B05B 5/06* (2006.01)

(52) U.S. Cl.
USPC .......................................... 427/164; 427/162

(58) Field of Classification Search
USPC .................................... 427/160.169
See application file for complete search history.

(56) References Cited

U.S. PATENT DOCUMENTS
2004/0240820 A1* 12/2004 Johnson et al. ............... 385/129

FOREIGN PATENT DOCUMENTS
EP    0266214 A2 *  5/1988

* cited by examiner

*Primary Examiner* — David Turocy
*Assistant Examiner* — Michael G Miller (57) ABSTRACT

The present invention provides a method of forming a flexible dichroic optical filter. The method comprises depositing a plurality of pairs of layers adjacent a substrate. Each of the plurality of pairs of layers includes a first layer formed of a silicon-and-carbon containing material having a first index of refraction and a second layer formed of a silicon-and-carbon containing material having a second index of refraction that is different than the first index of refraction.

23 Claims, 5 Drawing Sheets

DICHROIC FILTERS FORMED USING SILICON CARBIDE BASED LAYERS

BACKGROUND OF THE INVENTION

1. Field of the Invention

This invention relates generally to dichroic filters, and, more particularly, to flexible dichroic filters formed of multiple layers comprising silicon and carbon chemical elements.

2. Description of the Related Art

The term dichroic is derived from the Greek word dikhroos, which means two-colored. When used in the optical arts, the term dichroic refers to any optical device which can split a beam of light into two beams with differing wavelengths. Dichroic color filters selectively transmit light with a small range of colors (i.e., a frequency or wavelength range) while reflecting other colors of light. Dichroic color filters may be formed by layering multiple thin films or coatings over a surface of a transparent material. The layers or coatings are formed used materials having different refractive indices and are applied in thicknesses of one-quarter or one-half a selected wavelength. The wavelength or frequency bands that are transmitted and/or reflected can be controlled by varying the thicknesses and/or the refractive indices of the layers. For example, conventional dichroic optical filters are based on a quarter wave stack design, in which alternating layers of high and low refractive index materials are deposited on a transparent substrate in quarter wave optical thicknesses. Thus, a filter can be designed to transmit specific wavelengths and reflect those which are undesirable.

Conventional dichroic optical filters are formed of a relatively large number of layers. For example, more than 20 layers of alternating high and low refractive index material may be used to form a conventional dichroic optical filter. Consequently, the deposition time required to form the layers of a conventional dichroic optical filter may be relatively large and the resulting structure may have relatively low mechanical stability. Thus, conventional dichroic filters formed of a large number of layers may be stress inherent and relatively expensive to build. Furthermore, conventional dichroic optical filters are formed using multiple layers of metal oxides that are produced by physical vapor deposition.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for forming a flexible dichroic optical filter. The method comprises depositing a plurality of pairs of layers adjacent a plastic substrate. Each of the plurality of pairs of layers includes a first layer formed of a silicon-and-carbon containing material having a first index of refraction and a second layer formed of a silicon-and-carbon containing material having a second index of refraction that is different than the first index of refraction. A dichroic optical filter formed by embodiments of this method are also set forth in another embodiment of the present invention.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
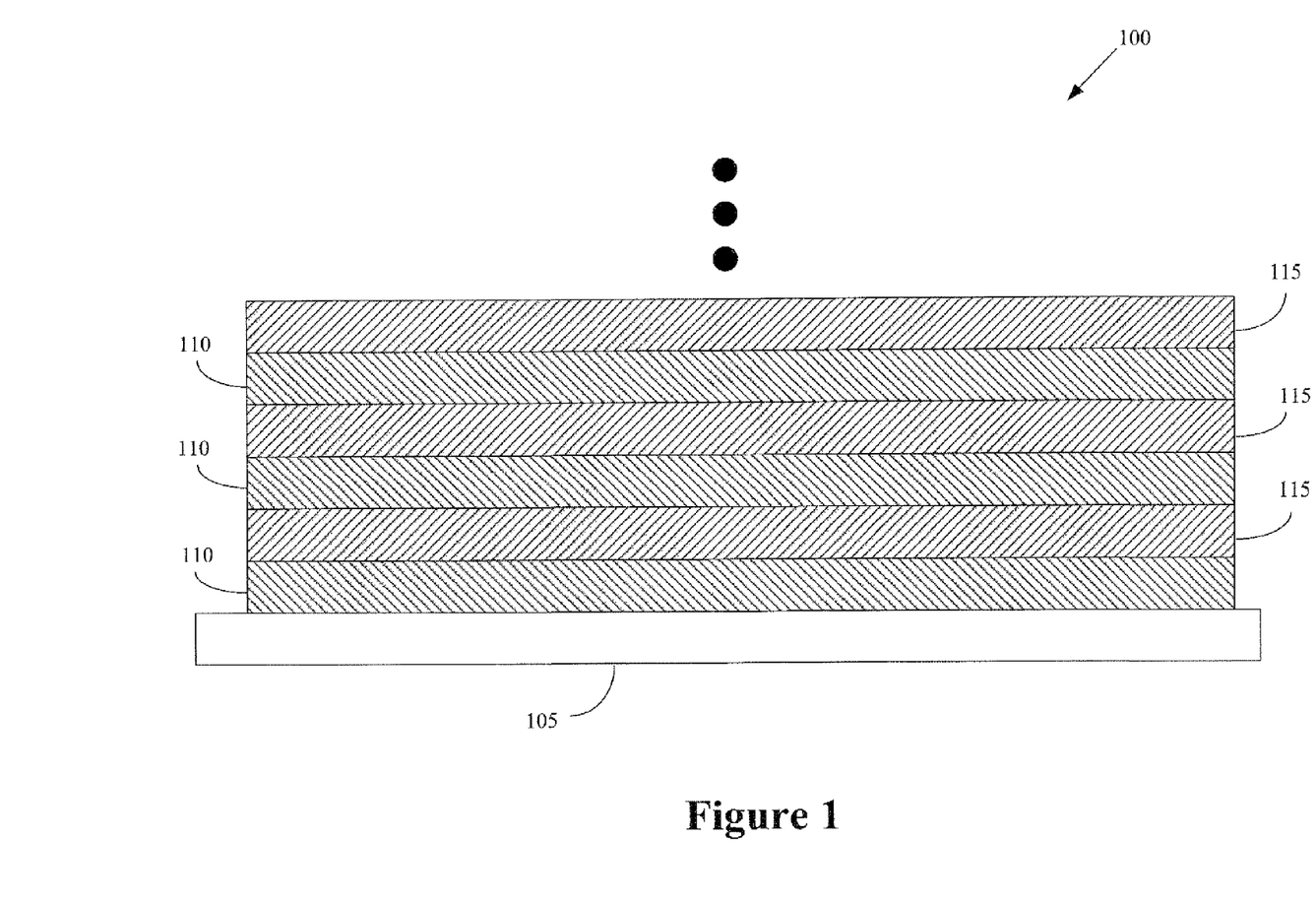
FIG. 1 shows a schematic of a composite multilayer construction of a dichroic color filter with alternating low (L) and high (H) refractive index layers prepared by plasma enhanced chemical vapor deposition (PECVD)

FIG. 1 conceptually illustrates one exemplary embodiment of a dichroic filter 100. In the illustrated embodiment, the dichroic filter 100 includes a substrate 105. For example, the substrate 105 may be formed of a polyethylene naphthalate (PEN) plastic film, a polyethylene terephthalate (PET) plastic film, and the like. Persons of ordinary skill in the art having benefit of the present disclosure should appreciate that only a portion of the substrate 105 is shown in FIG. 1 and that in some embodiments the substrate 105 may be sheet of material having two dimensions (e.g., a length and a width) that are significantly larger than a third dimension (e.g., a thickness) of the substrate 105. For example, the substrate 105 may have a diameter of 200 mm and a thickness of 0.13 mm. In alternative embodiments, the substrate 105 may be transparent and/or flexible. The degree of transparency and/or flexibility is a matter of design choice and may be selected based upon properties that may be useful and/or desirable for particular implementations of the dichroic filter 100.

Alternating layers 110, 115 of materials having different indices of refraction are formed above the substrate 105 to build the dichroic filter 100. Although three pairs of alternating layers 110, 115 are depicted in FIG. 1, persons of ordinary skill in the art having benefit of the present disclosure should appreciate that the present invention is not limited to this number of alternating layers 110, 115. In alternative embodiments, more or fewer pairs of alternating layers 110, 115 may be formed above the substrate 105. For example, 20 pairs of alternating layers 110, 115 may be deposited above a substrate 105. Chemical vapor deposition (CVD) and/or plasma-enhanced chemical vapor deposition (PECVD) may be used to deposit the alternating layers 110, 115. In a typical CVD process, the substrate 105 is exposed to volatile precursors, which may react with and/or decompose on the surface of the substrate 105 to produce the desired deposit and form the layer 110, 115. Volatile byproducts are also produced, which are removed by gas flow through the reaction chamber. Plasma enhanced CVD processes utilize plasma to enhance chemical reaction rates of the precursors. PECVD processing may allow deposition at lower temperatures.

In the illustrated embodiment, the alternating layers 110, 115 are formed by plasma enhanced chemical vapor deposition using precursor gases that include silicon and carbon. For example, a SiC-based dichroic filter 100 may be manufactured by PECVD using trimethylsilane (Z3MS) as a precursor gas to deposit the alternating layers 110, 115 on a flexible transparent polyethylennaphtalate (PEN) substrate 100 using parallel plate (capacitive) reactor, as will be discussed in more detail below. The SiC-based dichroic color filter 100 comprises a periodic stack of SiC-based alternating low (L) refractive index (n≦1.5) material 110 and high (H) refractive index (n≧1.9) material 115. The periodic stack of alternating layers 110, 115 incorporates N of the L/H pairs of layers 110, 115, where N is typically greater than or equal to 10. The low and high refractive index materials 110, 115 are formed to have a selected ratio, r, of optical thickness $\tau_{H,L}=n_{H,L}\cdot d_{H,L}$ of the H and L layers 110, 115. The physical thickness of each layer is given by $d_{H,L}$.

The low refractive index layer 110 may be a dielectric high-oxygen doped hydrogenated amorphous silicon carbide coating based on the structural unit SiOC:H. The structural unit that is the basis for the material may be evaluated by Energy Dispersion Spectroscopy (EDS) and/or Rutherford Backscattering Spectroscopy (RBS), and the atomic bonding structure may be determined by Fourier Transform InfraRed Spectroscopy (FTIR). In one embodiment, the low refractive index layer 110 is deposited at a relatively low plasma power (typically less than 200 W), a relatively low (compared to the high refractive index layer 115) inert gas flow rate (typically less than 800 sccm), and a relatively high (compared to the high refractive index layer 115) oxygen flow rate (typically more than 20 sccm). The low refractive index layer 110 may also have a relatively high hydrogen content, low (almost zero) compressive stress, and high transparency (90% and above). When deposited on a transparent PEN substrate 105, the low refractive index layer 110 provides improved transparency and enhanced light transmission, i.e. the low refractive index material 110 may exhibit antireflective properties.

The high refractive index layer 115 may be a dielectric low-oxygen doped hydrogenated amorphous silicon carbide coating based on the structural unit SiOC:H. The structural unit that is the basis for the material may be evaluated by Energy Dispersion Spectroscopy (EDS) and/or Rutherford Backscattering Spectroscopy (RBS), and the atomic bonding structure may be determined by Fourier Transform InfraRed Spectroscopy (FTIR). The high refractive index layer 115 may be deposited at a relatively high plasma power (typically more than 400 W), a relatively high (compared to the low refractive index layer 110) inert gas flow rate (typically more than 800 sccm), and a relatively low (compared to the low refractive index layer 110) oxygen flow rate (typically less than 20 sccm). Compared to the low refractive index layer 110, the high refractive index layer 115 may have a relatively low hydrogen content, higher compressive stress (below 400 MPa), and lower transparency (80% and below).

The spectral characteristics of the dichroic filter 100 may also be determined as a function of the incident light angle. For example, the UV VIS transmission and reflection spectra may be determined for incidence angles ranging from 0 to 45 degree. Spectral characteristics such as the center wavelength of the reflected band, the reflected bandwidth, the peak transmission, and out-of-band blocking of the dichroic filter 100 have been determined to be a function of both the number of L and H layers 110, 115 and the angle of incident light, as will be discussed further herein.

In one exemplary embodiment, the SiC-based dichroic color filter 100 is formed of a periodic stack of SiC-based alternating relatively low refractive index (n≈1.4) material (L) layers 110 and relatively high refractive index (n≈1.9) material (H) layers 115. The periodic stack includes 10 LH pairs 110, 115. The physical thickness of the L and H layers 110, 115 is $d_{H,L}=100$ nm and the ratio, $r=\tau_H/\tau_L$, of optical thickness $\tau_{H,L}=n_{H,L}\cdot d_{H,L}$ of the H and L layers 110, 115 is:

$$r=1.9/1.4=1.357.$$

In this exemplary embodiment, the low refractive index material is a dielectric high-oxygen doped SiC:H coating with compositional ratios of Si/C=0.58, and O/Si=0.64 as evaluated by Energy Dispersion Spectroscopy (EDS). The high refractive index material is a dielectric low-oxygen doped SiC:H coating with compositional ratios of Si/C=0.80, and O/Si=0.22 as evaluated by Energy Dispersion Spectroscopy (EDS).

Table 1 lists the deposition parameters (process conditions) and the resulting film properties for the low and high refractive index material layers 110, 115. In this exemplary embodiment, the low refractive index material layer 110 has been deposited at low plasma power (150 W), low inert gas flow rate (600 sccm), and a high oxygen flow rate (30 sccm). The low refractive index material layer 110 has low (−9 MPa)

compressive stress. The high refractive index material layer 115 has been deposited at high plasma power (500 W); high inert gas flow rate (1200 sccm) and low oxygen flow rate (15 sccm). The high refractive index (RI) material layer 115 has higher compressive stress (−395 MPa). Both, L and H layers are well adhered to the substrate and withstand the standard tape test.

TABLE 1

| | PROCESS CONDITIONS | | | | | | | FILM PROPERTIES | | |
|---|---|---|---|---|---|---|---|---|---|---|
| | | | (CH3)3SiH | He | | O | | | | |
| COATING | Pressure mTorr | Power Watts | Flow sccm | Flow sccm | He/(CH3)3SiH | Flow sccm | O$_2$/(CH3)3SiH | DR A/MIN | RI | Stress MPa |
| L | 1500 | 150 | 150 | 600 | 4 | 30 | 0.2 | 1324 | 1.437 | −8.8 |
| H | 320 | 500 | 100 | 1200 | 12 | 15 | 0.15 | 1360 | 1.913 | −395 |

Figure 2:
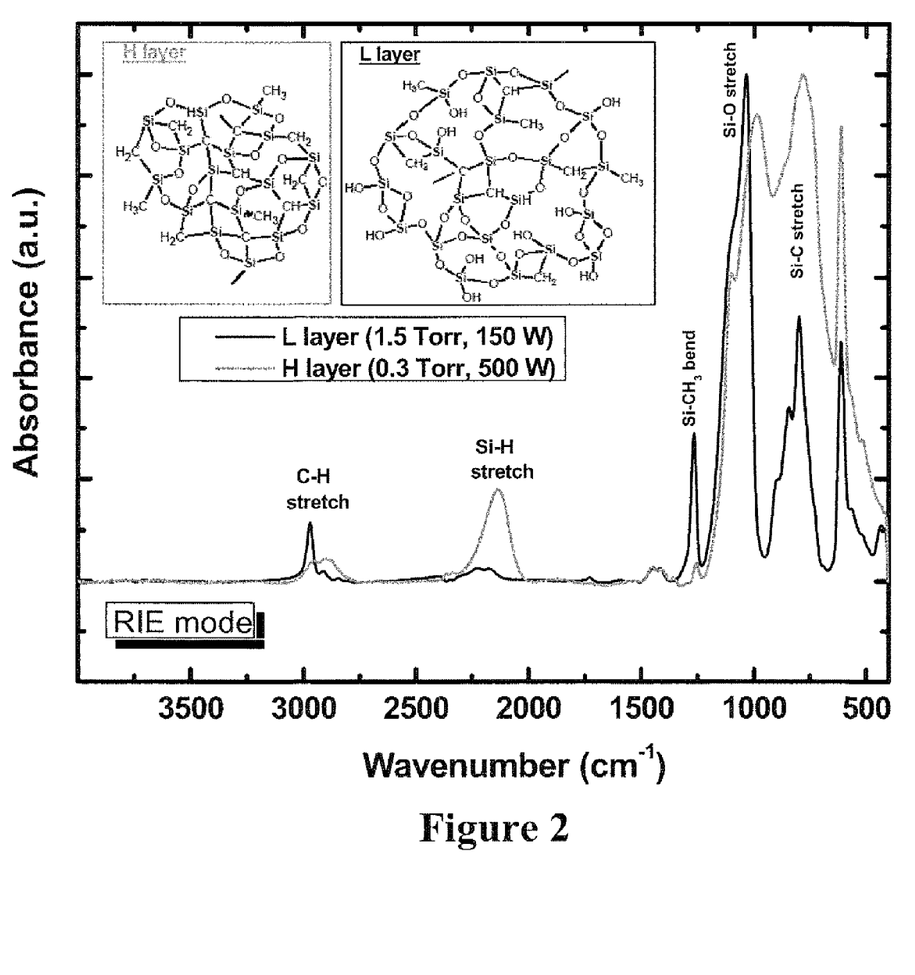
FIG. 2 presents Fourier transform infrared (FTIR) spectra of low (L) and (H) refractive index SiOC:H dichroic coatings, and idealized structural models of coatings are shown in the frames.

FIG. 2 shows the Fourier transform infrared (FTIR) spectra of low (L) and high (H) refractive index SiOC:H dichroic coatings. The absorbance is plotted along the vertical axis in arbitrary units and the wave number is plotted along the horizontal axis in units of cm$^{-1}$. The FTIR spectrum of the low refractive index coating is plotted using a black line and the FTIR spectrum of the high refractive index coating is plotted using a gray line. The low and high refractive index coatings exhibit different features due to different composition and atomic bonding structure of the materials. The atomic bonding structure of the high refractive index material layer 115 determined by FTIR, indicates intensive Si—C, Si—O and Si—H stretching oscillations. A structural model fragment is illustrated in the inset in FIG. 2 that is labeled "H Layer." The atomic bonding structure of the low refractive index material layer 110 determined by FTIR indicates intensive Si—O stretching oscillation as well as minimized Si—C and Si—H one. Due to the high chemical affinity of oxygen toward Si—H radicals, part of the terminating Si—H bonds in the film network have been replaced by bridging oxygen atoms. Another structural model fragment is illustrated in the inset in FIG. 2 that is labeled "L Layer."

Figure 3:
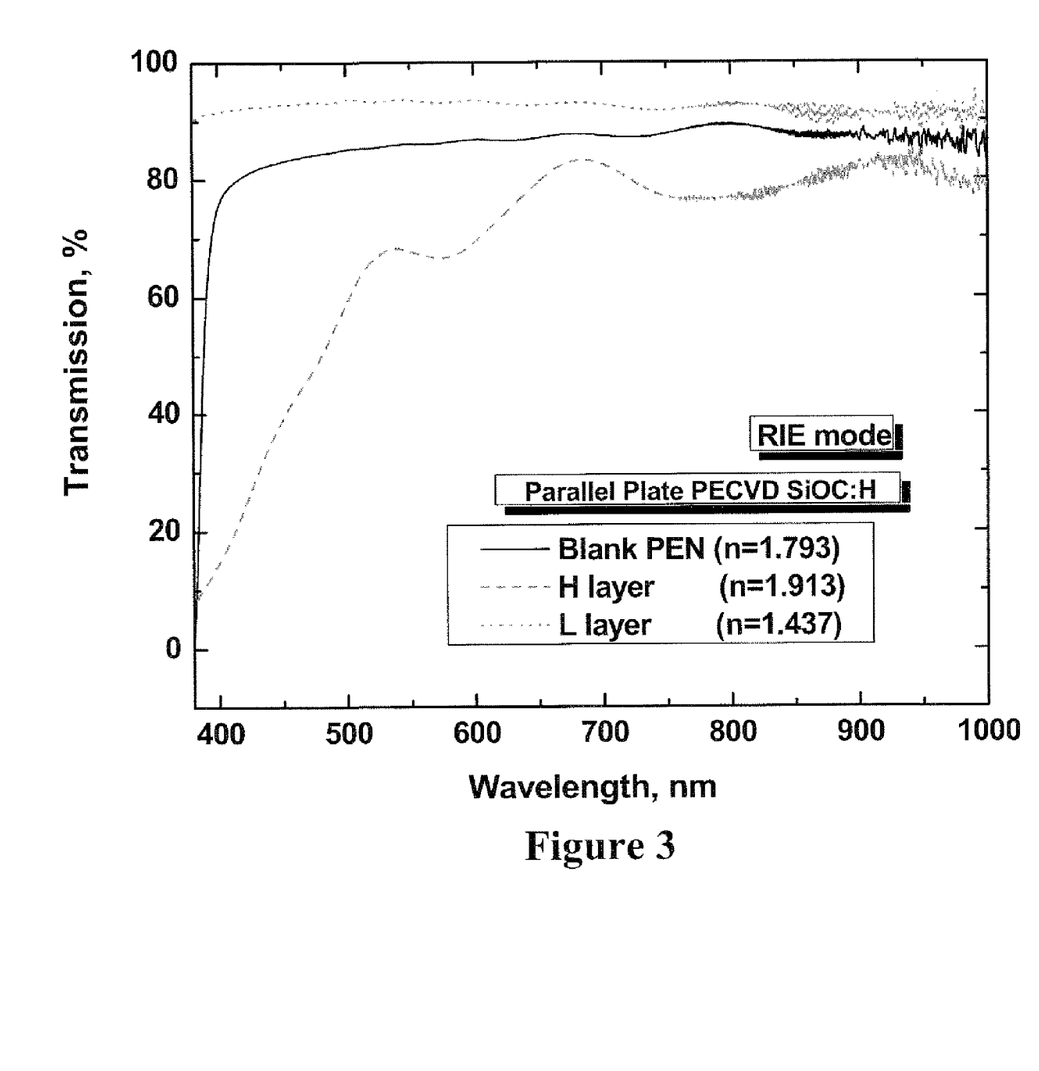
FIG. 3 depicts ultraviolet-visible (UV-VIS) transmission spectra of blank, L-coated and H-coated polyethylennaphtalate (PEN) film.

FIG. 3 shows the UV-VIS transmission spectra of a blank polyethylennaphtalate (PEN) substrate, a PEN substrate that is coated with the low refractive index material, and a PEN substrate that is coated with the high refractive index material. The transmission percentage is plotted on the vertical axis and wavelength is plotted on the horizontal axis in units of nanometers. The substrate that is coated with the low refractive index material has a relatively high transparency (i.e., a transparency of 90% and above). Thus, when deposited on the PEN substrate, the L coating provides improved transparency and enhanced light transmission relative to the blank substrate, i.e. the low refractive index material exhibits antireflective properties. The transparency of the substrate coated with the high refractive index coating is lower than both the transparency of the substrate coated with the low refractive index coating and the transparency of the blank substrate (i.e., 80% and below) over the wavelength range shown in FIG. 3.

Figure 4A:
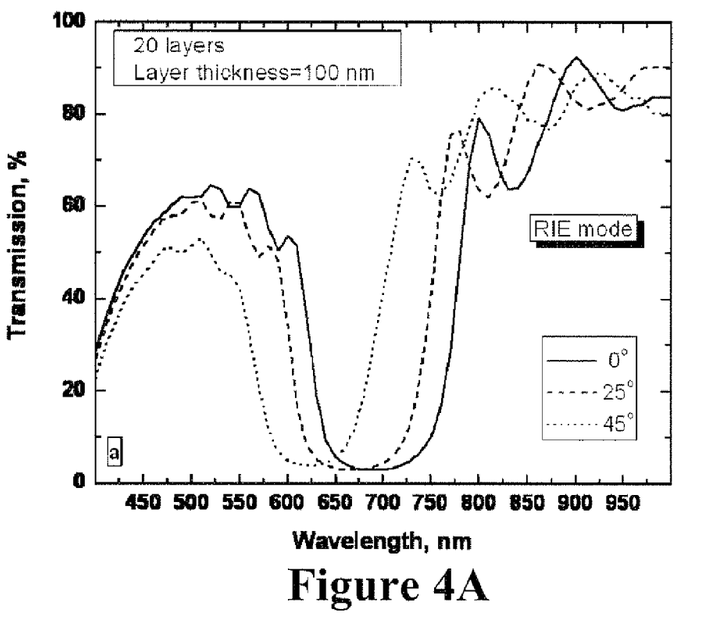
FIGS. 4a and 4b present spectral characteristics of multilayer SiC-based dichroic filter for different light incident angles: a) UV-VIS transmission spectra; b) UV-VIS reflection spectra.
Figure 4B:
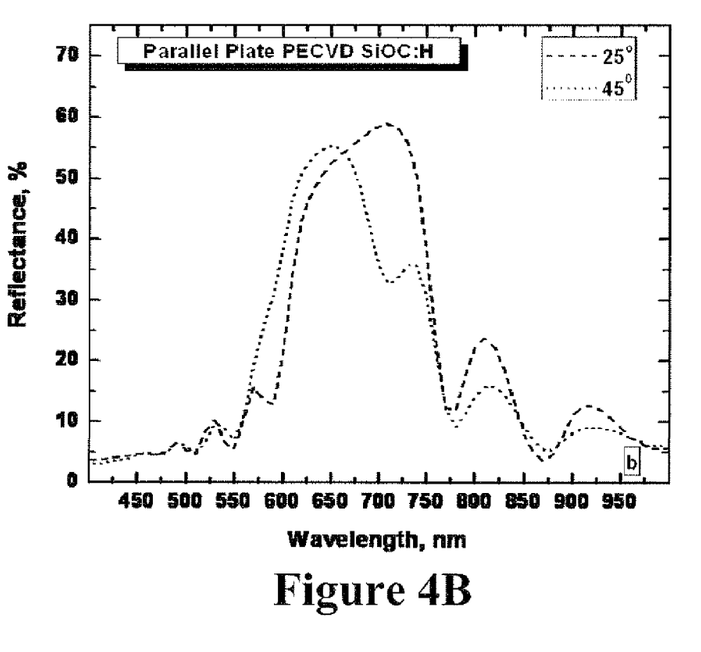

FIGS. 4A and 4B illustrate spectral characteristics of a multilayer SiC-based dichroic color filter for different light incident angles. FIG. 4A illustrates a UV-VIS transmission percentage as a function of wavelength in nanometers for several angles of incident light from 0 to 45 degrees and FIG. 4B illustrates a UV-VIS reflection percentage as a function of wavelength in nanometers for several angles of incident light from 0 to 45 degrees. In the illustrated embodiment, the multilayer SiC-based dichroic color filter includes 20 pairs of alternating layers of low and high refractive index material. For twenty layers construction with an optical thickness of the H material of approximately 190 nm (physical thickness of 100 nm), the center wavelength of the reflected band is around 725 nm, which correlates well with the quarter wavelength rule. The reflected bandwidth (full width at half maximum) is approximately 150 nm. This exemplary dichroic filter can therefore be classified as a notch filter or, more precisely, a red-reflecting dichroic minor that fully reflects red and transmits yellow, green, cyan, and blue bands. Violet bands are only partially transmitted. Peak transmission is between 65 and 95%, and out-of-band blocking is better than an optical density of 1.5 (transmission less than 3%). This exemplary dichroic filter also exhibits sensitivity to the light incidence angles, shifting to shorter wavelengths when the angle of incident light is increased (FIGS. 4A and B).

Figure 5:
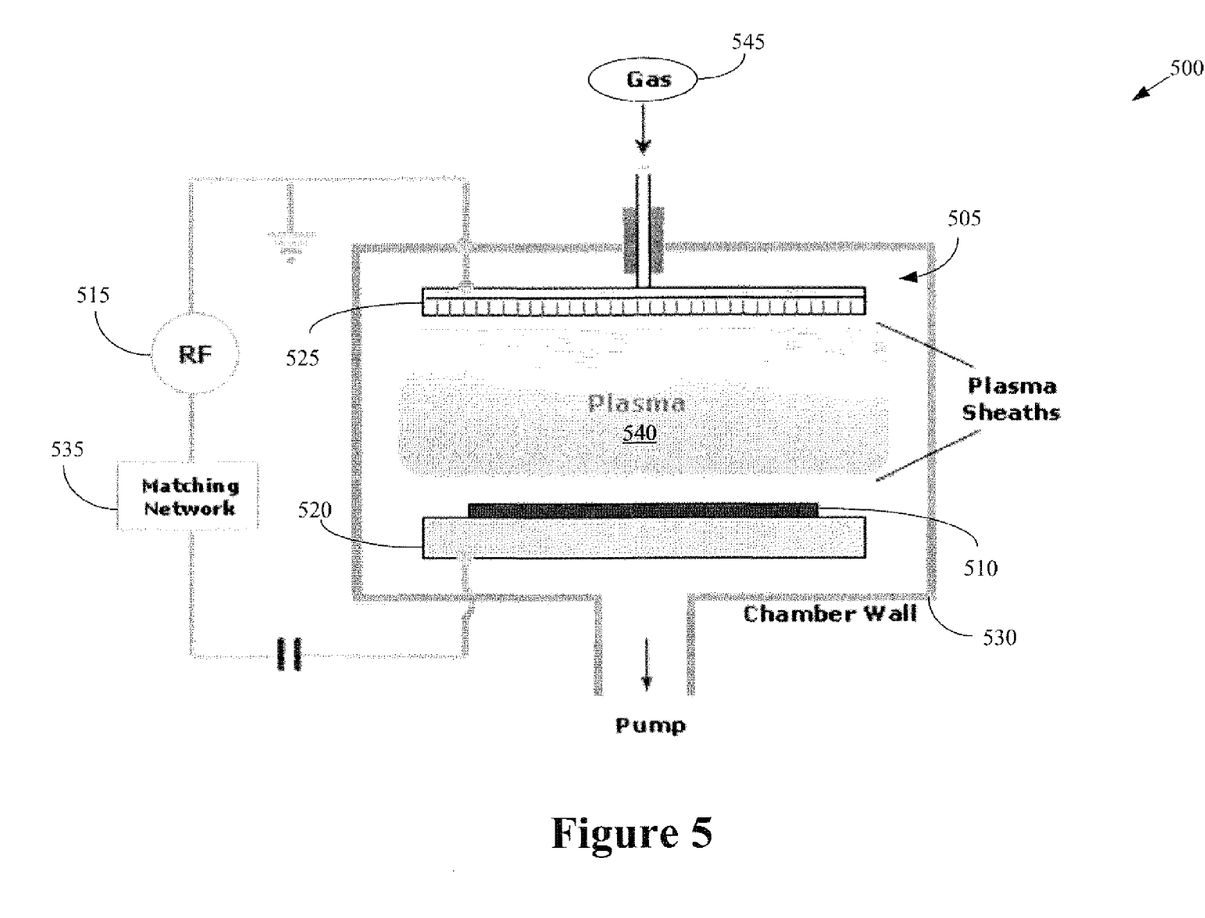
FIG. 5 depicts a schematic of a parallel-plate PECVD reactor in RIE configuration used for manufacturing of dichroic color filters.

FIG. 5 conceptually illustrates one exemplary embodiment of capacitive type parallel plate reactor 500 that may be used to deposit the alternating layers in a dichroic filter described herein. Persons of ordinary skill in the art having benefit of the present disclosure will appreciate that in the interest of clarity only the features of the reactor system 500 and the process chamber 505 that are relevant to the present invention are depicted in FIG. 5 and described herein. The reactor 500 receives a single wafer 510 and has a showerhead diameter and a hole configuration that provides approximately uniform deposition on 200 mm (8") substrates. The plasma is excited and sustained by a 13.56 MHz power supply 515 coupled to the smaller area bottom electrode 520 (which may also act as a substrate holder) The top electrode 525 (which also acts as the showerhead) and chamber walls 530 are grounded. In this configuration defined as the "reactive ion etching" mode (RIE), the large voltage drop results in larger peak ion energies, hence directionality of an accelerated energetic ion flux, which favors precursor excitation and fragmentation, leading to high deposition rates. In the illustrated embodiment, an impedance matching network 535 is interposed between the output of the power supply 515 and the load is driving (plasma) to reduce signal reflections and degradation caused by impedance mismatch. The purpose of the impedance matching network 535 is to provide efficient power transfer to the plasma 540 (via power dissipation in the discharge) and to protect the power supply 515.

A gas source 545 is used to provide one or more gases to the process chamber 505. Although a single gas source 545 is depicted in FIG. 5, persons of ordinary skill in the art having benefit of the present disclosure should appreciate that the present invention is not limited to a single gas source 545. In alternative embodiments, any number of gases 545 may be introduced into the process chamber 505. In one embodiment, a gas source 545 provides gases including a silicone and carbon to the process chamber. The gas source 545 may also provide oxygen, as well as one or more inert gases, such as argon and helium. For example, the gas source 545 may provide a gas mixture consisting of trimethylsilane [(CH3)3SiH] as a silicon-carbon containing precursor, with or without helium as an inert gas.

In operation, one side of the substrate 525 is exposed to the plasma in the process chamber 505. One or more layers (not shown) may then be deposited on the substrate 525 while it is exposed to the plasma. For example, if the plasma is formed from a gas including silicon, carbon, and hydrogen, a layer may be formed of hydrogenated silicon carbide based on the structural unit SiC:H. For another example, if the plasma is formed from a gas including silicon, carbon, hydrogen, and oxygen, a layer may be formed of hydrogenated silicon oxycarbide based on the structural unit SiOC:H. Operating parameters of the reactor system 500, such as, plasma power, chamber pressure, gas concentrations and/or flow rates, may be adjusted to achieve certain properties of the layer, such as a selected refractive index, optical thickness, and/or physical thickness. In one embodiment, the operating parameters may be adjusted so that the layer has a relatively high density and low nanoporosity compared to conventional hydrogenated silicon carbide and/or siloxane films. The deposition rate of the barrier layer may also depend on one or more of the operating parameters of the reactor system 500. For example, the deposition rates may depend upon the plasma power and chamber pressure.

The alternating layers that make up embodiments of the dichroic filters described herein may be formed using a single reactor system 500 that uses different operating parameters to form the layers having different refractive indices. Alternatively, more than one reactor system 500, or a cluster multichamber reactor system that includes a plurality of chambers similar to the chamber shown in FIG. 5, may be used to form the layers having different refractive indices.

Dichroic filters such as the SiC-based optical structures described herein exhibit the dichroic filtering effect with relatively small number of LH pairs (around 20 layers) relative to conventional dichroic filters. Reducing the number of layer pairs is generally advantageous because it may permit deposition times to be reduced and may improve mechanical stability of the structure. This allows flexible dichroic constructions to be realized on transparent plastic substrates. In contrast, conventional dichroic filters that include a large number of layers (N>>20) are more stress inherent and expensive to build than the dichroic filters described herein. For example, applying the additive rule, the residual stress in a composite SiC-based stack comprising about 20 LH pairs has been estimated to less than 200 MPa. The relatively low compressive stress and the good adhesion and thermal stability of the SiC-based dichroic structures make them very convenient to build on flexible plastic substrates. The SiC-based dichroic filters may be formed using chemical vapor deposition and/or plasma-enhanced chemical vapor deposition techniques, and therefore may not suffer from the drawbacks of conventional metal oxides-based constructions produced by physical vapor deposition (PVD) methods.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method of forming a flexible dichroic optical filter, comprising:
    depositing a plurality of pairs of layers above a flexible transparent plastic substrate, each of the plurality of pairs of layers comprising a first layer formed of a silicon-and-carbon containing material having a first index of refraction, a first hydrogen content, a first compressive stress, a first water vapor transmission rate, and a first transparency and a second layer formed of a silicon-and-carbon containing material having a second index of refraction, a second hydrogen content, a second compressive stress, a second water vapor transmission rate, and a second transparency, such that the first index of refraction is lower than the second index of refraction; the second hydrogen content is lower than the first hydrogen content, the second compressive stress is larger than the first compressive stress, the second water vapor transmission rate is lower than the first water vapor transmission rate, and the second transparency is lower than the first transparency.

2. The method of claim 1, comprising providing the plastic substrate to at least one vacuum processing chamber and wherein depositing the plurality of pairs of layers comprises exposing at least one portion of the substrate that is within said at least one processing chamber to a plasma comprising a silicon- and carbon-containing precursor gas.

3. The method of claim 2, wherein the plurality of pairs of layers comprises depositing the plurality of pairs of layers using at least one of plasma enhanced chemical vapor deposition and chemical vapor deposition.

4. The method of claim 3, wherein depositing the plurality of layers comprises depositing the plurality of pairs of layers by exposing the substrate to trimethylsilane during said at least one of plasma enhanced chemical vapor deposition or chemical vapor deposition.

5. The method of claim 1, wherein depositing the first and second layers comprises depositing the first layer at first plasma power, a first inert gas flow rate, and a first oxygen flow rate and depositing the second layer at second plasma power that is higher than the first plasma power, a second inert gas flow rate that is higher than the first inert gas flow rate, and a second oxygen flow rate that is lower than the first oxygen flow rate.

6. The method of claim 5, wherein depositing the first and second layers comprises depositing the first and second layers formed of a dielectric hydrogenated amorphous silicon oxycarbide coating based on the structural unit SiOC:H with the first layer being deposited using the first oxygen flow rate of more than 20 SCCM and the second layer being deposited using the second oxygen flow rate of less than 20 SCCM.

7. The method of claim 1, wherein depositing the first and second layers comprises depositing the first and second layers having first and second thicknesses, respectively, of approximately 100 nm.

8. The method of claim 1, wherein depositing the plurality of pairs comprises depositing less than 20 pairs of first and second layers adjacent the substrate.

9. A dichroic optical filter formed by a process comprising:
    depositing a plurality of pairs of layers above a flexible transparent substrate, each of the plurality of pairs of layers comprising a first layer formed of a silicon-and-carbon containing material having a first index of refraction, a first hydrogen content, a first compressive stress, a first water vapor transmission rate, and a first transparency and a second layer formed of a silicon-and-carbon containing material having a second index of refraction, a second hydrogen content, a second compressive stress, a second water vapor transmission rate, and a second transparency, such that the first index of refraction is lower than the second index of refraction; the second hydrogen content is lower than the first hydrogen content, the second compressive stress is larger than the first compressive stress, the second water vapor transmission rate is lower than the first water vapor transmission rate, and the second transparency is lower than the first transparency.

10. The dichroic optical filter as set forth in claim 9, the process comprising providing the plastic substrate to at least one processing chamber and wherein depositing the plurality of layers comprises exposing at least one portion of the substrate that is within said at least one processing chamber to a plasma comprising a silicon-and-carbon containing precursor gas.

11. The dichroic optical filter formed by the process of claim 10, wherein depositing the plurality of pairs of layers comprises depositing the plurality of pairs of layers using at least one of plasma-enhanced chemical vapor deposition and chemical vapor deposition.

12. The dichroic optical filter formed by the process of claim 11, wherein depositing the plurality of pairs of layers comprises exposing the plurality of pairs of layers to trimethylsilane during said at least one of plasma enhanced chemical vapor deposition and chemical vapor deposition.

13. The dichroic optical filter formed by the process of claim 9, wherein depositing the first and second layers comprises depositing the first layer at first plasma power, a first inert gas flow rate, and a first oxygen flow rate and depositing the second layer at second plasma power that is higher than the first plasma power, a second inert gas flow rate that is higher than the first inert gas flow rate, and a second oxygen flow rate that is lower than the first oxygen flow rate.

14. The dichroic optical filter formed by the process of claim 13, wherein depositing the first and second layers comprises depositing the first and second layers formed of a dielectric hydrogenated amorphous silicon oxycarbide coating based on the structural unit SiOC:H with the first layer being deposited using the first oxygen flow rate of more than 20 SCCM and the second layer being deposited using the second oxygen flow rate of less than 20 SCCM.

15. The dichroic optical filter formed by the process of claim 9, wherein depositing the first and second layers comprises depositing the first and second layers having first and second thicknesses, respectively, of approximately 100 nm.

16. The dichroic optical filter formed by the process of claim 9, wherein depositing the plurality of pairs comprises depositing less than 20 pairs of first and second layers adjacent the substrate.

17. A flexible dichroic optical filter, comprising:
a flexible transparent plastic substrate; and
a plurality of pairs of layers above the flexible transparent plastic substrate, each of the plurality of pairs of layers comprising a first layer formed of a silicon-and-carbon containing material having a first index of refraction, a first hydrogen content, a first compressive stress, a first water vapor transmission rate, and a first transparency and a second layer formed of a silicon-and-carbon containing material having a second index of refraction, a second hydrogen content, a second compressive stress, a second water vapor transmission rate, and a second transparency, such that the first index of refraction is lower than the second index of refraction; the second hydrogen content is lower than the first hydrogen content, the second compressive stress is larger than the first compressive stress, the second water vapor transmission rate is lower than the first water vapor transmission rate, and the second transparency is lower than the first transparency.

18. The flexible dichroic optical filter as set forth in claim 17, wherein the flexible transparent plastic substrate is exposed to trimethylsilane during at least one of plasma enhanced chemical vapor deposition and chemical vapor deposition.

19. The flexible dichroic optical filter as set forth in claim 17, wherein the first layer is deposited at a first plasma power, a first inert gas flow rate, and a first oxygen flow rate and the second layer is deposited at a second plasma power that is higher than the first plasma power, a second inert gas flow rate that is higher than the first inert gas flow rate, and a second oxygen flow rate that is lower than the first oxygen flow rate.

20. The flexible dichroic optical filter as set forth in claim 19, wherein the first layer comprises a dielectric hydrogenated amorphous silicon oxycarbide coating based on the structural unit SiOC:H deposited using a first oxygen flow rate of more than 20 SCCM.

21. The flexible dichroic optical filter as set forth in claim 20, wherein the second layer comprises a dielectric hydrogenated amorphous silicon oxycarbide coating based on the structural unit SiOC:H deposited using a second oxygen flow rate of less than 20 SCCM.

22. The flexible dichroic optical filter set forth in claim 17, wherein the first and second layers have first and second thicknesses, respectively, of approximately 100 nm.

23. The flexible dichroic optical filter set forth in claim 17, wherein the plurality of pairs comprises less than 20 pairs of first and second layers.

* * * * *

UNITED STATES PATENT AND TRADEMARK OFFICE
CERTIFICATE OF CORRECTION

PATENT NO. : 8,481,109 B2  Page 1 of 1
APPLICATION NO. : 12/597764
DATED : July 9, 2013
INVENTOR(S) : Zambov et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 445 days.

Signed and Sealed this
Eighth Day of September, 2015

Michelle K. Lee
*Director of the United States Patent and Trademark Office*